Oct. 9, 1934.  T. S. FULLER  1,976,488
VACUUM ELECTRICAL DEVICE
Filed July 25, 1931
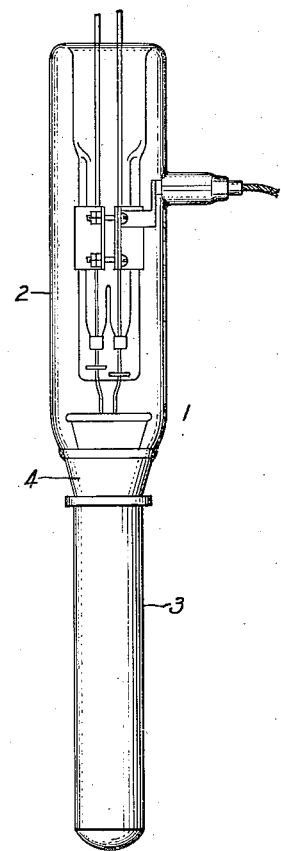
Inventor:
Truman S. Fuller,
by Charles E. Fuller,
His Attorney.

Patented Oct. 9, 1934

1,976,488

UNITED STATES PATENT OFFICE 1,976,488

VACUUM ELECTRICAL DEVICE

Truman S. Fuller, Niskayuna, N. Y., assignor to General Electric Company, a corporation of New York Application July 25, 1931, Serial No. 553,120

7 Claims. (Cl. 250—27.5)

The present invention relates to electrical devices and more particularly to a method for fabricating copper for use in the construction of envelopes for vacuum electrical devices, such as vacuum switches or water cooled vacuum tubes. Devices of this character generally comprise an evacuated envelope which is constructed partially of glass. The glass is usually sealed to a copper sleeve and in conjunction with the latter comprises at least a portion of the envelope. In the operation of such devices, it is necessary to maintain a high degree of vacuum. Usually this involves some difficulty due to the fact that the construction of such devices involves successive heating to high temperatures in air and in hydrogen. Ordinarily when copper is heated at high temperatures in an oxidizing atmosphere, oxygen penetrates into the copper. When the copper is heated thereafter in a hydrogen atmosphere the oxygen is removed, thereby creating a porous condition throughout the copper. When such porous copper is employed as a portion of the envelope of a vacuum electric device it permits the entrance of oxygen into the vacuum device and the usefulness of the latter is thereby greatly impaired. The oxygen which penetrates into the copper when the latter is heated in an oxidizing atmosphere may be oxygen in solution in the copper and will hereinafter be termed harmful oxygen.

I have found that if copper intended for use as a portion of the envelope of a vacuum electrical device is deoxidized in the manner hereinafter disclosed it is substantially impervious to harmful oxygen. Copper which has been prepared in accordance with the present invention and which has been heated to a temperature of 800 to 900° C. under oxidizing conditions and subsequently heated in hydrogen to a temperature of 800° C., may become porous or crack open on the surface to a slight extent. The porosity or cracking is confined however to a very thin surface layer less than .003 inch and usually not greater than .0015 inch in thickness. Since the thinnest portion of a copper sleeve comprising a part of an evacuated envelope is ordinarily not less than 6 mils thick this outer thin porous layer in no way interferes with the operation of the electrical vacuum device.

The novel features which I belive to be characteristic of the present invention will be pointed out with particularity in the appended claims. The invention itself however will best be understood from reference to the following specification when considered in connection with the accompanying drawing in which the single figure shows diagrammatically an electric discharge device of the water cooled type.

Referring more particularly to the drawing, I have indicated at 1 a vacuum electrical device comprising an envelope consisting of a glass portion 2 and a copper anode 3 which is sealed to the glass portion by means of a thin copper sleeve 4.

In carrying out my invention, I melt the copper from which the sleeve and anode are to be fabricated and add to the molten metal two deoxidizing reagents. The latter may be added to the molten copper if desired while the latter is in the ladle. I prefer to employ silicon and calcium boride for this purpose, the quantity of silicon employed being usually about .03 of 1% and the quantity of boride being usually about .55 of 1%. It is immaterial whether the deoxidizing reagents are added successively or simultaneously to the molten copper. Satisfactory results have been obtained under both conditions. However, I have obtained particularly good results when the boride and silicon have been added in this order to molten copper.

Although I prefer to employ about .03 of 1% silicon and about .55 of 1% calcium boride reagent, the invention is not limited to these specific percentages. The quantity of reagent employed will usually depend upon the condition of the copper to be treated. In any event enough reagent is added so that a small quantity of it remains in the copper. In general the combined quantity of the reagents employed will not be greater than .75 of 1%. Copper which has been deoxidized in this manner is not brittle, may be easily rolled and is highly resistant to penetration by harmful oxygen when the copper is heated at elevated temperatures in an oxidizing atmosphere.

Copper which has been deoxidized by silicon alone resists penetration of oxygen at elevated temperatures to a certain extent. However such copper when heated at very high temperatures in air, for example 900° C. and subsequently heated to about 800° C. in hydrogen may crack open or become porous to a depth greater than 3 mils. Substantially the same result may be obtained by the use of calcium alone.

While calcium boride and certain other reagents have been employed for the purpose of deoxidizing copper the resultant product does not offer high resistance to penetration of harmful oxygen at elevated temperatures. However when reagents such as calcium boride and silicon are employed together the resultant product is very resistant to penetration of harmful oxygen at elevated temperatures and this is true to a slightly lesser degree with either silicon or calcium when employed alone.

It is my present opinion that the resistance to penetration of harmful oxygen in copper which has been deoxidized by silicon and calcium boride is due to the presence of a very small amount of silicon which may be present in solid solution in the copper. The quantity of silicon present in the solid solution is obviously very small and probably within the range of about .01 to .03%.

What I claim as new and desire to secure by Letters Patent of the United States, is:

1. An electrical device comprising an evacuated envelope, said envelope comprising a cuprous structure, said cuprous structure containing an appreciable quantity of a deoxidizing reagent.

2. An electrical device comprising an evacuated envelope, said envelope including a cuprous structure, said structure containing a deoxidizing reagent in sufficient quantity to prevent excessive penetration of oxygen in said cuprous structure when heated to high temperatures in air.

3. An electrical device comprising an evacuated envelope, a portion of said envelope consisting of copper containing an appreciable quantity of silicon.

4. An electrical device comprising an evacuated envelope, a portion of said envelope consisting of copper containing an appreciable quantity of calcium.

5. A vacuum electric device comprising an evacuated envelope, a portion of said envelope consisting of copper which has been deoxidized with silicon and calcium boride and which retains a portion of one of said deoxidizing mediums.

6. The method of preparing copper for use as a portion of a vacuum electric device which comprises adding calcium boride and silicon to the molten copper in an amount substantially in excess of that required to remove the oxygen from the copper.

7. The method for preparing copper for use as a portion of a vacuum device which comprises adding calcium boride to the molten copper in an amount sufficient to deoxidize the copper and then adding a relatively small quantity of silicon to the deoxidized copper.

TRUMAN S. FULLER.